United States Patent
Zarecki

(10) Patent No.: US 8,845,791 B2
(45) Date of Patent: Sep. 30, 2014

(54) CONTAMINANT REMOVAL FROM GAS STREAMS

(75) Inventor: Corey Zarecki, La Crosse, WI (US)

(73) Assignee: Gundersen Lutheran Health System, La Crosse, WI (US)

( * ) Notice: Subject to any disclaimer, the term of this patent is extended or adjusted under 35 U.S.C. 154(b) by 411 days.

(21) Appl. No.: 13/293,503

(22) Filed: Nov. 10, 2011

(65) Prior Publication Data

US 2012/0111193 A1     May 10, 2012

Related U.S. Application Data

(60) Provisional application No. 61/412,262, filed on Nov. 10, 2010.

(51) Int. Cl.
    *B01D 53/14*      (2006.01)
    *B01D 53/04*      (2006.01)

(52) U.S. Cl.
    CPC ...... *B01D 53/0415* (2013.01); *B01D 2257/304* (2013.01); *B01D 2259/40084* (2013.01); *B01D 2259/41* (2013.01)
    USPC ............ 95/214; 95/45; 95/226; 95/235; 96/4; 96/278; 96/329; 96/371

(58) Field of Classification Search
None
See application file for complete search history.

(56) References Cited

U.S. PATENT DOCUMENTS

| | | | |
|---|---|---|---|
| 1,750,632 A | 3/1930 | Farmer | |
| 2,877,098 A * | 3/1959 | Ruth | 422/177 |
| 4,449,991 A | 5/1984 | Brannon et al. | |
| 4,818,258 A * | 4/1989 | Vann, III | 96/8 |
| 5,453,118 A * | 9/1995 | Heiligman | 96/147 |
| 5,573,656 A | 11/1996 | Santos | |
| 6,132,495 A * | 10/2000 | Welch | 95/269 |
| 6,221,277 B1 | 4/2001 | Scranton, Jr. | |
| 6,231,755 B1 | 5/2001 | Mesher et al. | |
| 6,436,175 B1 * | 8/2002 | Coates et al. | 96/126 |
| 6,447,577 B1 | 9/2002 | Espin et al. | |
| 6,740,141 B2 | 5/2004 | Espin et al. | |

(Continued)

FOREIGN PATENT DOCUMENTS

EP     2 226 111 A1     9/2010

OTHER PUBLICATIONS http://www.merichem.com/resources/technical_papers/landfill_gas_technologies/index.php.
Sulfatreat product bulletin, 2009, www.sulfatreat.com.

(Continued)

*Primary Examiner* — Duane Smith
*Assistant Examiner* — Pankti Patel
(74) *Attorney, Agent, or Firm* — Charles S. Sara, Esq.; DeWitt Ross & Stevens SC

(57) ABSTRACT

A system and method of cleaning and scrubbing contaminants, including sulfides, from an unclean or raw gas includes one or more containers, each of which include a gas permeable receptacle or bag containing an appropriate gas scrubbing medium for removing the contaminants from the gas stream. A gas extraction device is adapted via inserted into the gas scrubbing medium with the gas permeable receptacle wherein the gas extraction device is connected to at least one gas outlet port in the container. A series of containers can be used wherein the containers are connected sequentially to remove the gas. A system for bypassing one of the plurality of containers in order to clean out the container while the gas cleaning mechanism is still in operation is also described.

16 Claims, 7 Drawing Sheets

(56) References Cited

U.S. PATENT DOCUMENTS

| | | |
|---|---|---|
| 7,189,381 B2 | 3/2007 | Tupper |
| 7,704,299 B2 | 4/2010 | Mueller et al. |
| 7,744,841 B2 | 6/2010 | Farha |
| 2002/0073849 A1* | 6/2002 | Buettner et al. ............... 95/280 |
| 2005/0020441 A1 | 1/2005 | Tupper |
| 2007/0199872 A1* | 8/2007 | Mueller et al. ............... 210/189 |
| 2008/0095675 A1* | 4/2008 | Hartung ........................ 422/171 |
| 2009/0127184 A1 | 5/2009 | Pauwels et al. |
| 2011/0232494 A1* | 9/2011 | Dugan et al. .................... 96/242 |

OTHER PUBLICATIONS

Cline, et al., Biological Process for $H_2S$ Removal from Gas Streams the Shell-Paques/THIOPAQ™ Gas Desulfurization Process, Paper for the LRGCC, Feb. 23-26, 2003, Norman (Oklahoma), USA.

* cited by examiner

CONTAMINANT REMOVAL FROM GAS STREAMS

CROSS-REFERENCE TO RELATED APPLICATIONS

This application claims priority under 35 USC §119(e) to U.S. Provisional Patent Application 61/412,262 filed Nov. 10, 2010, the entirety of which is incorporated by reference herein.

FIELD OF THE INVENTION

The present invention provides a system and process for treating a process fluid. Specifically, the present invention is directed to a gas purification system for removing sulfides, such as hydrogen sulfide ($H_2S$), from gaseous streams.

BACKGROUND OF THE INVENTION

Many landfills and processing facilities are experiencing higher $H_2S$ concentrations in their gas. Many times, this gas needs to be cleaned of the $H_2S$. One process for achieving this is through the use of a solid $H_2S$ Scavenger System (Graubard, D. et al. (2010), "Cost-Effective Technologies for Removing $H_2S$ from Landfill Gas," (http://www.merichem.com/resources/technical_papers/landfill_gas_technologies/index.php). Typical gas scrubbing media consists of a ceramic base that is impregnated with iron oxide ($Fe_2O_3$). When the water-saturated gas containing $H_2S$ comes in contact with the media, the $H_2S$ is converted to Iron Pyrite ($FeS_2$). As disclosed in Graubard et al, in a typical solid media system in a tank, the gas passes in a down-flow direction. Sour gas enters at the top of the tank and sweet or cleaned gas exits the system at the bottom of the tank. Systems are designed for either batch processing (single vessel) or Lead-Lag operation (two vessels) that allows for continuous treatment of the $H_2S$.

Typical processing tanks in the prior art are large, approximately 10 feet in height and 8 feet in diameter. At the bottom of the tank are rocks on top of which rests a foam pad and then a gas scrubbing medium.

A preferred gas scrubbing medium is called SULFATREAT® (SulfaTreat, a business unit of M-I, LLC, Chesterfield, Mo.). Reference is made to the following website for a more information: www.sulfatreat.com. The SULFATREAT® medium is a granular material used for cleaning gasses and specifically used in the removal of $H_2S$ from gas streams, typically through a batch-processing treatment. It is typically prepared by placing the medium in a large receptacle or bag (often called a "Super Sack"), which is approximately 3 by 3 by 3½ feet tall and weighs approximately 2000 pounds.

A typical tank in the prior art will hold up to 16,000 pounds of gas scrubbing media (or eight bags of the SULFATREAT® media). The bags used for the SULFATREAT® media are typically made of coated black ultraviolet (UV) treated circular woven polypropylene. The tank includes access openings (or manways) usually at the top and side (near the bottom) of the tank. In operation, sour or raw gas enters the headspace near the top of the tank, flows through the SULFATREAT® media, then a foam pad, and then the rocks and out near the bottom as clean gas. The amount of cleaning depends in part on the level of incoming $H_2S$ or contaminant level and the condition of the media, i.e., how long it has been in cleaning operation.

Media change-out can be a messy operation with high pressure water hoses required to cut the spent material out of the vessel.

The following operations occur during change out:
1. The gas cleaning system is shut down, and the container is isolated and purged such that all $H_2S$ and other gaseous contaminants are removed from the container and to avoid the possibility of raw or sour gas entering the container while it is being serviced;
2. All inlet and outlet ports and piping are purged;
3. The top manway is opened and removed;
4. Water is added to fill the container to control dust and/or any heating, then drained;
5. The tank is thoroughly vacuumed;
6. A hammer, shovel, pick, and/or water pick is used as necessary to break loose material from the inner walls of the tank. The material is vacuumed as it breaks loose;
7. The bottom manway is opened to enable further cleaning and removal of spent scrubbing medium;
8. The old foam pad is removed;
9. A new foam pad is inserted;
10. Both manways are closed;
11. A pressure test is conducted;
12. The top manway is opened;
13. A forklift is used to bring bags of clean scrubbing media to a crane;
14. The crane lifts the bags above the top manway;
15. The bag is opened;
16. The scrubbing medium is drained from the bag into the tank;
17. The crane removes the empty bag;
18. The empty bag is taken to a landfill;
19. This process is repeated until approximately eight bags or 16,000 pounds of scrubbing media have been loaded into the polishing tank;
20. A rake or similar device is used to level out the media in the polishing tank;
21. The manway is closed;
22. The tank is pressure tested;
23. The tank is then run; and
24. The spent media is taken in a vacuum truck (with empty bags) to a landfill.

There are some significant problems with the current system.

First, it is very costly. Initial costs to install the tanks are high and, more importantly, the operating costs are extremely high.

Second, it is also a very dirty manually intensive job.

Third, it requires some large and unique equipment, such as an environmentally sanctioned vacuum truck, a crane or similar device, and a vehicle to get spent media to landfill.

Fourth, there is a significant time commitment. Under good circumstances, the change out process could take a full day's work for 2 to 4 people.

Fifth, the process requires coordination to be able to determine the best time to have the media changed.

Thus, there is needed another more economical system.

SUMMARY OF THE INVENTION

The invention, which is defined by the claims set forth at the end of this document, is directed to a system for removing contaminants from a gas stream, and particularly to a system for removing hydrogen sulfide from contaminated gas streams. A basic understanding of some of the features of preferred versions of the invention can be attained from a review of the following brief summary of the invention, with more details being provided elsewhere in this document. To assist in the reader's understanding, the following review makes reference to the accompanying drawings (which are briefly reviewed in the "Brief Description of the Drawings" section following this Summary section of this document).

Referring now to the drawings, the present invention is directed to a system for removing contaminants from a gas stream, comprising a container 10 having a base 12 and at least one wall 14 surrounding the base 12. The wall 14 includes a first base end 16 and a second lid end 18, wherein the base 12 and the wall 14 forming an opening, illustrated in FIG. 5, to an interior space 20 within the container 10. For purposes of the present invention, the wall 14 can be one circular or cylindrical wall or a plurality of walls. For example, the container 10 illustrated in the drawings includes a wall structure including four side walls 14a, 14b, 14c, and 14d. The container 10 further includes a removable lid 30 for positioning on the second lid end 18, a plurality of securing latches 32 for removably sealing the lid 30 to the second lid end 18, at least one gas inlet port 40 and at least one gas outlet port 50. In addition, the container 10 includes a removable gas permeable receptacle 60 or bag adapted to be placed within the interior 20 of the container 10. A gas scrubbing medium 62 for removing contaminants from the gas stream is placed within the receptacle 60. A gas extraction device 66 or lance is adapted to be inserted into the gas scrubbing medium 62, wherein the gas extraction device 66 is connected to at least one gas outlet port 50. It is within the scope of the present invention to include a plurality of gas extraction devices 66, preferably five, each connected to one of a plurality of gas outlet ports 50. The gas extraction devices 66 are placed in the gas scrubbing medium 62.

The present invention is also directed to a system for removing contaminants from a gas stream comprising a plurality of containers 10, described above, connected by piping which allows the gas stream to pass through the plurality of containers 10 sequentially. In addition to the features described above, each container 10 can also include a gas inlet port shut-off valve 70 and a gas outlet port shut-off valve 80. The container 10 can also include diversion piping 86 for bypassing the container 10 for change-out purposes. The diversion piping 86 also includes a diversion piping shut-off valve 90. In addition to the plurality of containers 10 sequentially connected to the system of the present invention, the present invention can include a polishing tank 100, known to the art, connected to the last container 10. The purpose of the polishing tank 100 is to remove any remaining last traces of contaminants from the gaseous stream. In this manner, the cleaned gas exiting the last container 10 of the series of containers 10, illustrated in FIG. 7, can enter the polishing tank 100 for a final scrubbing with scrubbing medium 62. If this final step involving the use of the polishing tank 100 is not required, the polishing tank can be equipped with shut-off or by-pass valves to allow the gas to by-pass the polishing tank 100 (fully or partially) to optimize the amount of extra cleaning needed while minimizing the use of the polishing tank.

The present invention is also directed to a method for scrubbing a fluid gas stream comprising providing a plurality of containers 10 as described above and passing the gas stream sequentially through the plurality of containers 10 to clean the gas stream and remove it of all contaminants. In addition, the method of the present invention comprises the steps enabling one of the containers 10 to be closed off from the rest of the containers 10 without disrupting the cleaning operation. This enables each container 10 to be cleaned of fully contaminated scrubbing medium 62 without necessarily stopping the entire cleaning operation. This method comprises opening the diversion piping shut-off valve 90, shutting off the gas inlet and gas outlet port shut-off valves 70, 80, purging the container 10 such that all $H_2S$ and other gaseous contaminants are removed from the container and to avoid the possibility of raw or sour gas entering the container 10 while it is being serviced, removing the removable lid 30, disconnecting the gas extraction device 66 (or devices) from each gas outlet port 50, removing the gas permeable receptacle 60 with the spent gas scrubbing medium 62 from the container 10, removing the gas extraction device 66 (or devices) from the gas permeable receptacle 60 containing the scrubbing medium 62, substituting a new gas permeable receptacle 60 with clean gas scrubbing medium 62, inserting the gas extraction device 66 (or devices) into the new gas permeable receptacle 60 and the clean scrubbing medium 62, replacing the new gas permeable receptacle 60 in the container 10, connecting the gas extraction device 66 (or devices) to the gas outlet port(s) 50, replacing the removable lid 30, opening the gas inlet and gas outlet port shut-off valves 70, 80 and shutting off the diversion piping shut-off valve 90.

The present system advantageously minimizes as much manual labor and manual labor costs as possible.

The cleaning and replacement process is much faster. The prior art tank may take about eight hours to clean out the polishing tank and requires two to four people. The process is very dirty and manual intensive. On the other hand, the new system can be handled by one or two people and takes approximately one to two hours to complete. Therefore, the new process drastically reduces manpower and time. In addition, the new process eliminates the more expensive requirements for a certified environmental vacuum system and other specialty personnel or equipment.

The useful life of the media is further extended. The media cleans until it is spent. However, due to timing, engine requirements, permit requirements, and the like, the prior art system typically requires a change and replacement of the media before the media is completely spent. With several smaller tanks in series, the media is more fully utilized.

Further, the overall time between changes for the same amount of media will be greatly increased.

Several smaller tanks make the present system inherently more versatile. For example, one or more tanks can be fairly easily isolated, for media change out or tank maintenance without requiring a stoppage of the entire system.

This system can also be used for other media systems, not just for $H_2S$ cleaning. It would also have application for odor control.

The objects and advantages of the invention will appear more fully from the following detailed description of the preferred embodiment of the invention made in conjunction with the accompanying drawings.

DETAILED DESCRIPTION OF PREFERRED VERSIONS OF THE INVENTION

Referring now to the figures, the present invention is directed to the concept of utilizing at least one and preferably a series of smaller containers 10 for the purpose of scrubbing a gaseous stream and removing contaminants from the gaseous stream. While the present invention is specifically directed to removing sulfides, such as hydrogen sulfide, from gaseous streams, the system of the present invention can be used to clean and scrub a variety of contaminants from gaseous streams depending upon the scrubbing medium used in the system.

Figure 1:
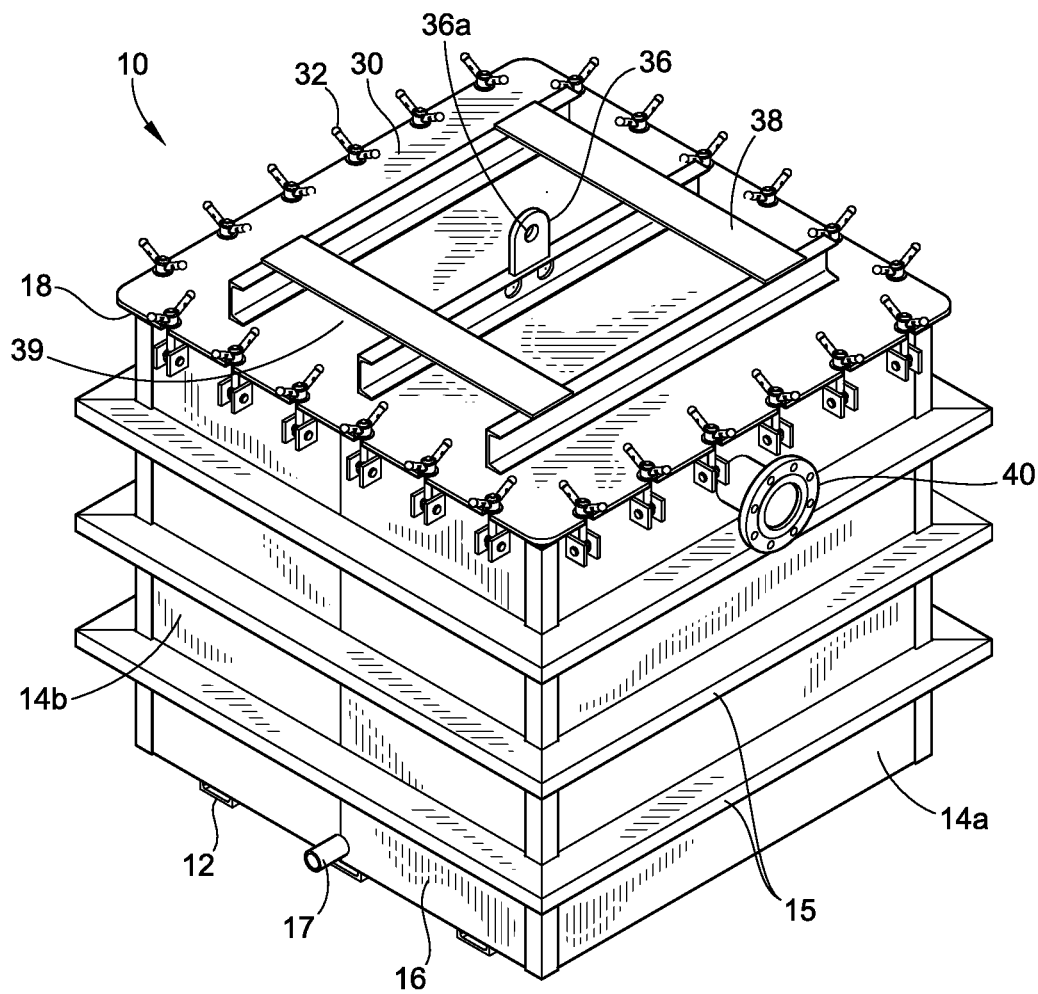
FIG. 1 is a perspective view of the container 10.
Figure 2:
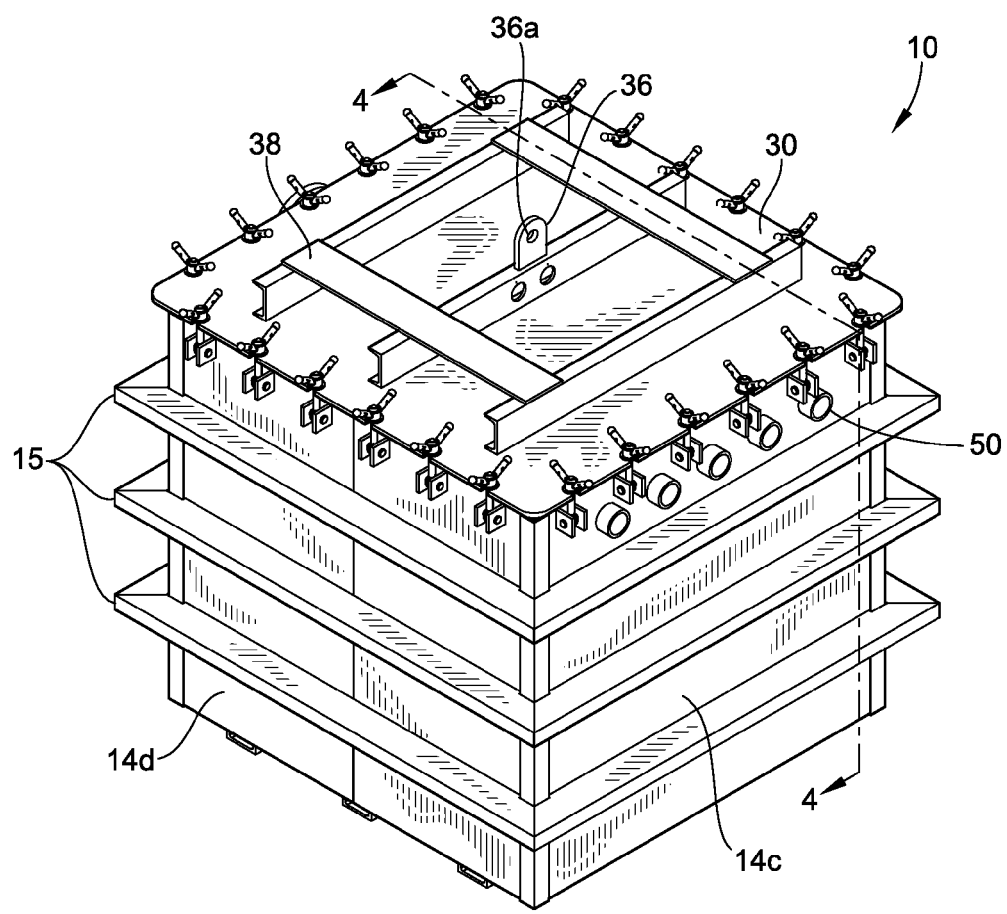
FIG. 2 is a perspective view of the other side of the container 10 showing five outlet ports 50.
Figure 3:
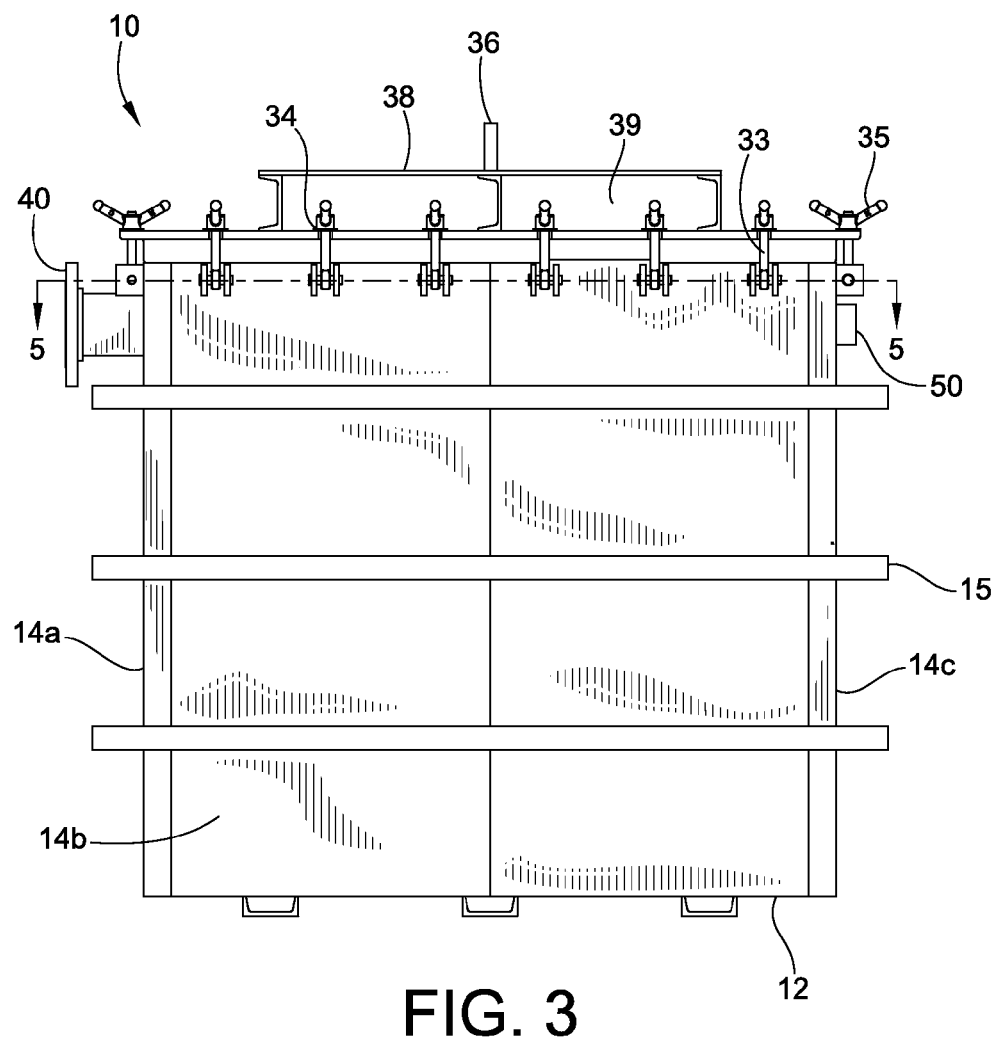
FIG. 3 is a side view of the container 10 showing the outlet ports 50 and the inlet port 40.
Figure 4:
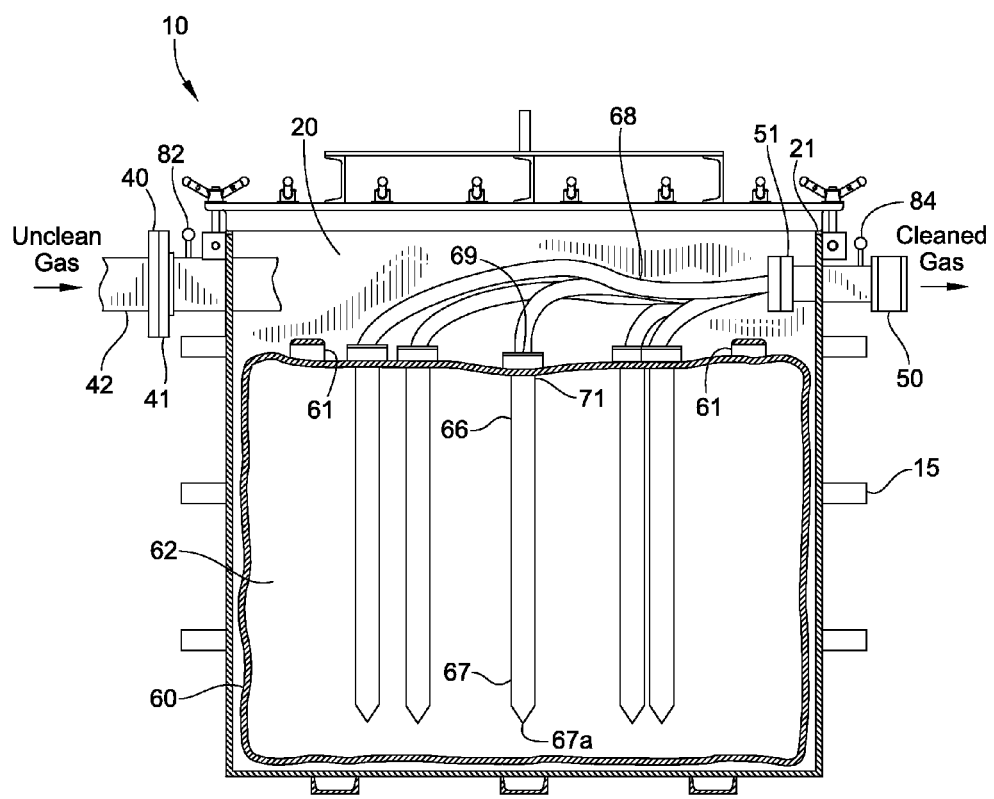
FIG. 4 is a cross sectional view of the container 10 taken along lines 4-4 of FIG. 2, showing the placement of the gas permeable receptacle or bag 60 and the placement of the gas extraction devices 66 within the bag 60. For purposes of viewing the gas extraction devices 66, the scrubbing medium is not illustrated with the bag 60 in order provide of view of the gas extraction devices 66. Ordinarily, the bag 60 would be filled with scrubbing media designated by reference number 62

Referring now to the figures, and particularly FIGS. 1-3, the system of the present invention is particularly directed to a container 10. As illustrated in FIGS. 1-3, the container 10 has a basic cubic shape with a base 12, four side walls 14a, 14b, 14c, and 14d each having a first base end 16 and a second lid end 18 to form a container 10 having an interior 20, as illustrated in FIG. 4. While four side walls 14a, 14b, 14c, and 14d are illustrated in the drawings as being of equal dimensions, it is within the scope of the present invention for the sides to have different lengths such that the container could be more rectangular in appearance. It is also within the scope of the present invention to have a container 10 with one cylindrical side or three or more sides as desired.

The container 10 also includes a removable lid 30 which is placed in sealing engagement on the lid end 18 and connected over the opening to the container 10 by a mechanism for sealing the removable lid 30 to the opening of the container 10. As illustrated in the figures, the sealing mechanism can consist of a plurality of securing latches 32. While the particular securing latches 32 of the present invention is illustrated by means of a rotating latch 33 which rotates from the side walls 14 through a notch 34 on the lid 30 and is secured by wing nuts or other securing devices 35, such as a nut, it is within the scope of the present invention to utilize any of a variety of securing mechanisms known to the art.

The lid 30 is also defined by a hitch device 36 which includes an opening 36a, which can be attached to a winch or similar machine for lifting and removing the lid 30 when necessary. In addition, a series of parallel securement pieces 38 can be placed on the lid 30 thereby forming one or more channels 39 on top of the lid 30 for easy removal of the lid 30 via forklift tongs (not illustrated) or the like.

While the opening and lid 30 is illustrated in the figures as a top opening to the container 10, it is within the scope of the present invention to provide the opening on the sides 14 of the container. Thus, the opening could easily be positioned at any of the sides 14a, 14b, 14c or 14d. Such a structure may be preferable for placement of the gas permeable receptacle or bag 60 of scrubbing medium 62. Rather than lifting the bag 60 over the sides 14 of the container 10, the bag 60 could simply be pushed into the interior 20 of the container 10 by means of the forklift or other vehicle.

While it can be a variety of sizes, a preferred size of the container 10 is a square tank having a length approximately four feet on each side 14a, 14b, 14c and 14d. This size is preferred in that it will ideally fit a standard receptacle or bag 60, known to the art, which contains approximately two thousand pounds of cleaning and scrubbing media 62.

Figure 5:
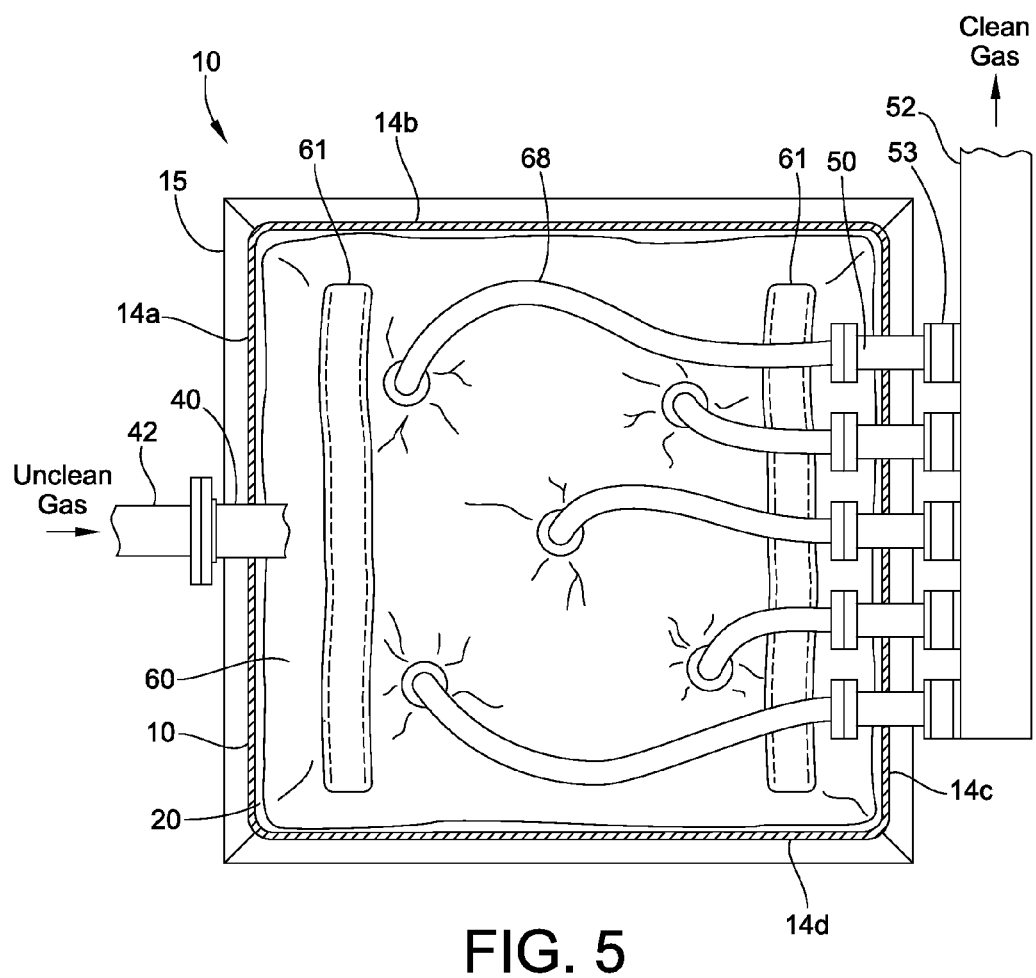
FIG. 5 is a cross-section view of the container 10 taken along lines 5-5 of FIG. 3, showing five flexible hoses 68 extending from the bag 60.

The lid 30 preferably includes a sealing gasket 21, illustrated in FIG. 5, situated between the lid end 18 of the container 10 and the lid 30 to provide a gas tight seal in the interior 20 of the container 10.

As illustrated in FIG. 1, one side wall 14b of the container 10 is defined by an inlet port 40, which purpose is to connect to an inlet line 42 for passing raw or unclean gas into the container 10. Referring now to FIG. 2, another side wall 14c of the container 10 will include at least one and preferably two to five gas outlet ports 50 which are designed to attach to a gas extraction pipe or line 52 for removing the cleaned gas from the container 10

The container 10 is preferably made of strong and preferably durable material, such as stainless steel to withstand pressures exerted on the container 10 during the gas scrubbing operation and to withstand corrosion from the gas. If desired, supports 15 can be added to each of the sides 14 for increased strength in the sides 14, depending upon the amount of operating pressure necessary within the closed and operating container 10. Each of the components, such as the outlet port 50 and the inlet port 40 are placed in the side walls 14 by welding or other means known to the art. While the sizes of the ports 40, 50 may change on certain needs, a preferred inlet port 40 will have an interior diameter of approximately four inches. The preferred outlet ports 50 will have an interior diameter of approximately two inches. In addition, a drain tube 17 can be added to the container 10 to enable liquid draining of the container 10 during the cleaning operation. The drain tube 17 can also preferably include a float drain trap, known to the art, or other device to remove liquid from the container 10, but retain the gas. Additionally, the drain tube preferably includes a valve for manually removing any liquid within the container 10.

Figure 6:
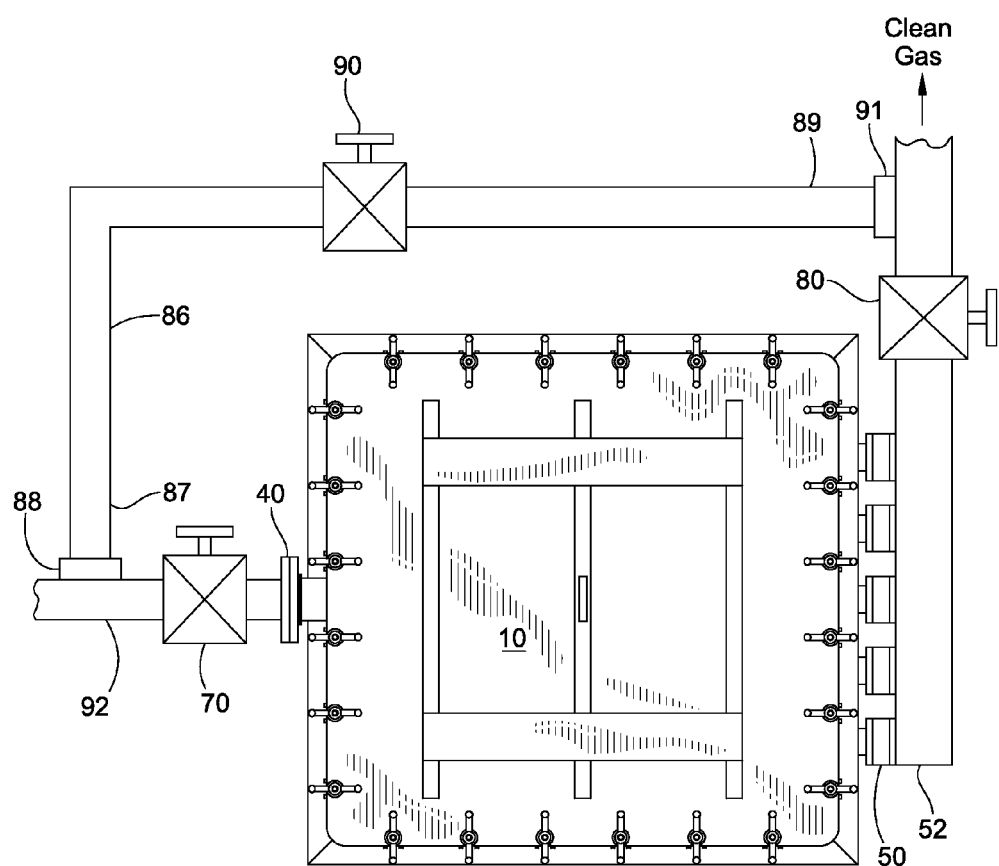
FIG. 6 is a top view of the container showing the diversion pipe 86, the inlet port shut-off valve 70 and the outlet port shut-off valve 80. The inlet port shut-off valve 70 is situated prior to the inlet port 40. The outlet port shut-off valve 80 is situated just beyond the outlet ports 50. The diversion pipe 86 is connected from the gas inlet pipe or line 42 to a gas extraction pipe or line 52.

Referring now to FIGS. 4 and 6, the interior 20 of the container 10 includes a removable flexible gas permeable receptacle or bag 60, which contains the gas scrubbing medium 62. For purposes of this disclosure, the terms "gas permeable receptacle" and "bag" will be used interchangeably. This provides an advantage over the prior art in that the prior art does not use bags in a typical gas scrubbing or cleaning process. Typically, the medium is delivered to a prior art tank in large bags, such as the bags which are used in the present invention. However, a crane or other device is used to lift the bags to the top opening (or manway) of the container wherein the bag is then opened and the medium is poured loosely into the container. The bag is then disposed. A disadvantage of the prior art operation is the difficulty and the cost to clean these prior art containers.

Unlike the prior art, the present invention uses a gas permeable receptacle or bag 60 which is permeable to gas. A preferred bag 60 is typically a coated ultra violet treated circular woven polypropylene bag, which is breathable, thereby allowing gases to invade the interior of the bag 60. While a breathable bag 60 is preferred, it is within the scope of the present invention to use a medium-containing bag which is not breathable or gas permeable. In this case, the bag 60 would be placed in the container 10 and then opened at the top to allow the incoming gaseous stream to permeate the medium 62. The bag 60 of the present invention preferably has hooks, loops or other devices 61 to allow a bag extraction machine, such as a forklift or crane, to remove the bag 60 with ease.

Located within the bag 60 is the gas cleaning or scrubbing medium 62. The medium for use in the present invention is directed to an absorbent composition which removes sulfur-containing compounds from a variety of fluids, and particularly from gaseous hydrocarbons. There are a variety of products in use for removing sulfur-containing compounds from liquid and gaseous streams. Reference is made to U.S. Pat. No. 7,744,841 to Farha and U.S. Pat. No. 6,221,277 to Scranton, Jr., the disclosures of which are incorporated herein by reference for a description of such compounds. A commercially available product is SULFATREAT® brand medium as described previously. SULFATREAT® is a federally registered trademark of M-I LLC (Houston, Tex.).

Referring again to FIGS. 4 and 5, the bag 60 is placed within the container 10. At least one and preferably up to five gas extraction devices 66 or lances then penetrate the bag 60 by piercing the bag with the distal end 67 of the lances 66. Only for purposes of illustrating the placement of the lances 66 in the bag 60, FIG. 4 is illustrated with the gas scrubbing media 62 being absent from the bag 60. Reference number 62 identifies the location of the scrubbing media. A preferred lance 66 is a perforated pipe of stainless steel or other material approximately two inches in diameter and long enough to extend to the bottom of the bag 60. As illustrated, the lance 66 is preferably approximately three to four feet long. Situated at the distal end 67 is a drive point or pointed end 67a to assist in the ease of penetrating the top of the bag 60 and the medium 62. A preferred lance 66 is made by Johnson Screens (New Brighton, Minn.). Permeable foam or other medium (not illustrated) can be placed in the top of the lance 66 (or anywhere along the outlet piping) for use as a particulate filter to keep the piping clean and to minimize particulates from entering the final filter pot.

The gas extraction pipe 66 is connected to a flexible connector hose 68 by means of connectors 69 at the proximate end 71 of the lance 66. The flexible connector hose can be made of any of a number of known materials such as reinforced rubber or fluid impermeable canvas or other materials, which may be reinforced with metal wires or the like. A preferred flexible hose is a stainless steel braided hose, which offers the advantages of strength and resistance to chemical and toxic (or raw) gas degradation. For purposes of the present invention, the term "connector" or "connectors" refers to any connectors known to the art for the purpose of connecting hoses to a receptacle such as a pipe or side of a wall. Standard connectors are made of metal such as brass, iron or steel, or other composite materials. Preferred connectors are of the "quick connect" variety known to art, where a male quick connector will removably connect to a female quick connector. The flexible connector hose 68 is then connected to a gas outlet port 50 by another series of connectors 51. In this manner, the gas extraction pipe 66 can remove gas, which has been scrubbed by virtue of the medium 62 within the bag 60. The gas then passes through the flexible hose 68 and out the outlet port 50 to an extraction pipe 52. A gas inlet line 42 is connected to the inlet port 40 at the inlet port connector 41. The gas extraction pipe 52 is connected to the outlet ports 50 at the area of the outlet port connectors 53.

At the onset of the operation, a bag 60 containing scrubbing media 62 is placed (by a crane, forklift or the like) adjacent the container 10. One or more gas extraction pipes 66 are inserted into the bag 60 containing the media 62 with or without the flexible connection hoses 68 attached. While an opening can be created in the bag 60, the sharpened end or drive point 67a of the lance 66 can be driven directly through the bag 60 for placement as illustrated in FIG. 4. Once the lances 66 are situated in the bag 60, the bag 60 is lifted from the ground by a forklift or crane which grabs the bag 60 by the loops 61 and lowered into the container 10. The flexible hoses 68 are then connected to the gas outlet ports 50 by the connectors 51. The lid 30 is then placed on the container 10 and secured by the securing latches 32. At this point, the container 10 is ready for use.

Raw or unclean gas enters the interior 20 of the container 10 via the inlet line 42 and the inlet port 40. The raw gas is moved through the entire system under pressure created by a blower 98, illustrated in FIG. 7. The gas is allowed to permeate the porous bag 60 which initiates the scrubbing and cleaning action via the movement of the gas through the scrubbing medium 62. The cleaned gas is then removed from the container 10 through the gas extraction device 66 and the flexible hose 68 to the outlet port 50 and the extraction pipe 52.

Once the operation is completed and the gas scrubbing medium 62 in the bag 60 is no longer able to clean or scrub the gas, the bag 60 can be removed from the container 10 and replaced. It is within the scope of the present invention to include container analyzers 82, 84 to determine when the bag 60 needs to replaced. A standard laser gas analyzer will be attached to each container tank 10 at the inlet port 40 and at the outlet port 50. In this manner an analyzer 82 will be placed at the inlet port 40 location and an analyzer 84 will be place at the outlet port 50 location to determine the amount of cleaning that is actually happening in each container 10. Analyzers are known to the art for this purpose. An exemplary gas analyzer is a laser gas analyzer is provided by Atmosphere Recovery, Inc. (Eden Prairie, Minn., USA). Additionally, a gas chromatographic analyzer or a Draeger gas detection tube analyzer (Cross Instrumentation, Conyers, Ga., USA) can be used.

With a new bag 60, it is expected that entering gas will be fifty to sixty percent cleaner when departing through the outlet port 50. This can be detected by the analyzers 84. Over time, the cleaning capacity of the medium 62 will diminish. Once the cleaning ability diminishes to a cleaning rate of perhaps five to ten percent, the bag 60 is ready to be changed.

Advantageously, the cleaning operation has been simplified over the prior art. Once the lid 30 is removed, the flexible hoses 68 can be removed from the outlet ports 50. The bag 60 is then typically removed from the container 10 and the lances 66 are extracted from the bag 60. The bag 60 can then be transferred to a dump site, with little or no clean-up operation necessary in the container 10.

Referring now to FIG. 6, each container 10 in the series can be fitted with a diversion pipe 86 in which the distal end 87 of the diversion pipe 86 is connected to the inlet line 42 by connectors 88 and the proximal end 89 of the diversion pipe 86 is connected to the extraction pipe 52 by connectors 91. The diversion pipe 86 also includes a diversion pipe shut-off valve 90 known to the art for shutting off the flow of gas through the pipe 86.

In order to isolate one particular container 10 from the series of containers 10, the diversion pipe shut-off valve 90 is opened. Then, both the gas inlet port shut-off valve 70 and the gas outlet port shut-off valve 80 is closed off thereby diverting the unclean gas through the diversion pipe 86 to the extraction pipe 52. In this manner, no gas will enter this container 10. However, the unclean gas will simply be passed through to the next container 10 in sequence. During this operation, the container 10 which has been bypassed can be changed out according to the process described previously. Once the container 10 has been fully cleaned, a new bag 60 of medium 62 is added and the container lid 30 secured, the container 10 can now be placed into operation by reversing the operation of the three valves 70, 80, 90. In this manner, the cleaning operation can continue without the necessity of ceasing the entire operation in order to clean out one container 10.

Figure 7:
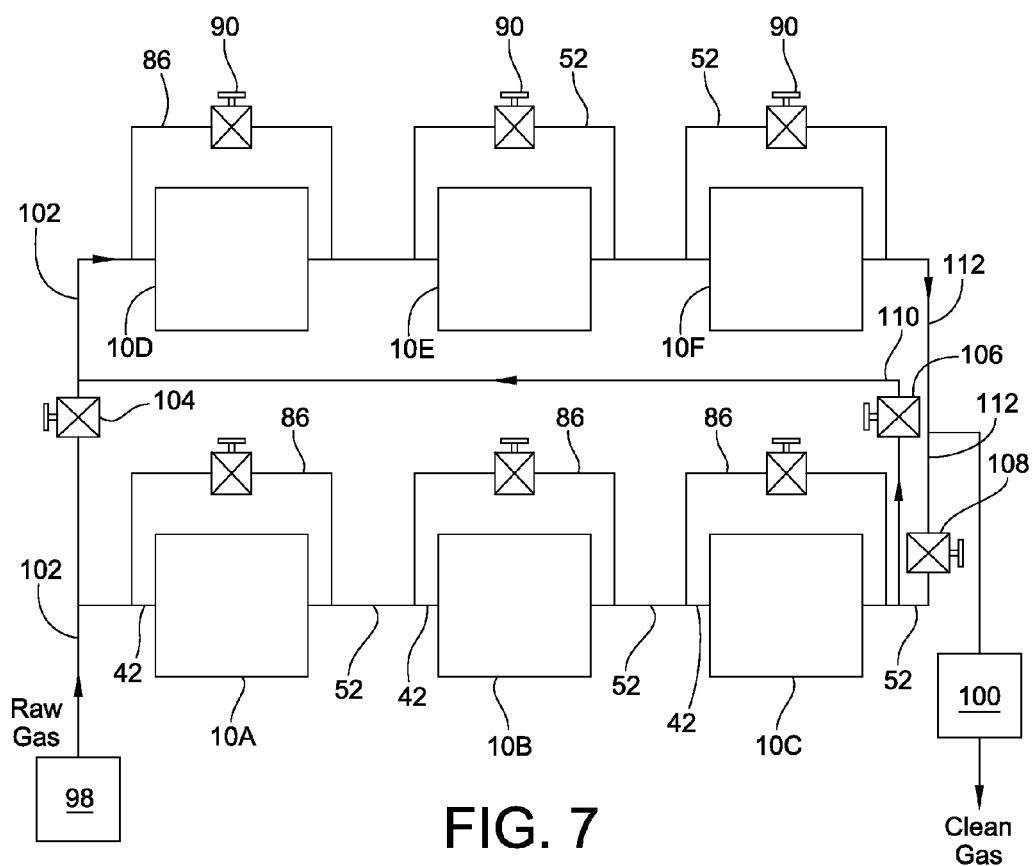
FIG. 7 is a schematic drawing showing six containers 10A-F in series configuration or two sets of three containers 10 in parallel.

Referring now to FIG. 7, a series of containers 10A-F can be joined together by connection lines such that the containers 10A-F can operate in parallel or in series. For parallel operation, the shut valves 104 and 108 will be in the on or open position allowing gas to flow through pipelines 102 and 112. Shut off valve 106 will be in the closed position prevent gas from flowing through line 110. In this manner, raw gas will enter line 102 by action of the blower 98 and pass through containers 10A and 10D simultaneously for processing. The cleaned gas will then exit containers 10A and 10D and enter containers 10B and 10E for further scrubbing and cleaning, and finally through containers 10C and 10F for further scrubbing and cleaning. If desired, more containers may be placed in parallel as desired. Once the gas exits the final containers, in this case 10C and 10F, the gas will pass through line 112. The cleaned gas exiting the last containers 10C and 10F of the series of containers 10, illustrated in FIG. 7, can enter the polishing tank 100 for a final scrubbing. If this final step involving the use of the polishing tank 100 is not required, the polishing tank can be equipped with shut-off or by-pass valves to allow the gas to by-pass the polishing tank 100 (fully or partially) to optimize the amount of extra cleaning needed while minimizing the use of the polishing tank.

For operation in series, the shut valves 104 and 108 will be in the closed position and the shut off valve 106 will be opened. In this manner, raw gas will enter line 102 by action of the blower 98 for passing first through container 10A. The gas will then be sequentially cleaned and scrubbed through containers 10B and 10C. As the shut off valve 108 is in the closed position, the gas exiting from container 10C enters line 110 for diversion to line 102 which passes the gas to and through containers 10D, 10E and 10F in sequence. Upon exiting container 10F, the gas passes through line 112 and then to the polishing tank 100 if desired, as described above.

It is also within the scope of the present invention to reverse the flow of the raw gas such that the raw gas enters the gas outlet port 50, passes through the connection hose 68 and the gas extraction device 66 to and through the scrubbing medium 62, passing out of the container 10 via the gas inlet port 40.

Any version of any component or method step of the invention may be used with any other component or method step of the invention. The elements described herein can be used in any combination whether explicitly described or not.

All combinations of method steps as used herein can be performed in any order, unless otherwise specified or clearly implied to the contrary by the context in which the referenced combination is made.

As used herein, the singular forms "a," "an," and "the" include plural referents unless the content clearly dictates otherwise.

Numerical ranges as used herein are intended to include every number and subset of numbers contained within that range, whether specifically disclosed or not. Further, these numerical ranges should be construed as providing support for a claim directed to any number or subset of numbers in that range. For example, a disclosure of from 1 to 10 should be construed as supporting a range of from 2 to 8, from 3 to 7, from 5 to 6, from 1 to 9, from 3.6 to 4.6, from 3.5 to 9.9, and so forth.

All patents, patent publications, and peer-reviewed publications (i.e., "references") cited herein are expressly incorporated by reference in their entirety to the same extent as if each individual reference were specifically and individually indicated as being incorporated by reference. In case of conflict between the present disclosure and the incorporated references, the present disclosure controls.

The devices and methods of the present invention can comprise, consist of, or consist essentially of the essential elements and limitations described herein, as well as any additional or optional steps, ingredients, components, or limitations described herein or otherwise useful in the art.

It is understood that the invention is not confined to the particular construction and arrangement of parts herein illustrated and described.

The invention claimed is:

1. A system for removing contaminants from a gas stream, comprising:
   a. A container having a base and at least one wall surrounding the base, the wall having first base end and second lid end, where the base and the wall form an interior space within the container, the container further including
      i. a removable lid for positioning on the second lid end,
      ii. a mechanism for removably sealing the lid to the second lid end
      iii. at least one gas inlet port, and
      iv. at least one gas outlet port;
   b. a gas permeable receptacle adapted to be placed within the interior space of the container;
   c. a gas scrubbing medium for removing contaminants from the gas stream, wherein the gas scrubbing medium is placed within the gas permeable receptacle; and
   d. a gas extraction device adapted to be inserted into the gas permeable receptacle, wherein the gas extraction device is connected to the at least one gas outlet port.

2. The system of claim 1, wherein the gas permeable receptacle is a closable bag enclosing the gas scrubbing medium.

3. The system of claim 2, wherein the gas permeable receptacle includes loops for removal from the container.

4. The system of claim 1 wherein the gas extraction device is adapted to pierce the gas permeable receptacle.

5. The system of claim 1 wherein the gas extraction device is connected to the at least one gas outlet port by a conduit tube.

6. The system of claim 1 comprising a plurality of gas extraction devices each connected to one of a plurality of gas outlet ports.

7. The system of claim 1 further comprising a sealing gasket between the second lid end of the container and the removable lid.

8. A system for removing contaminants from a gas stream comprising a plurality of container units connected by piping allowing the gas stream to pass through the plurality of container units sequentially, wherein each container unit comprises:
   a. a container having a base and at least one wall surrounding the base, the wall having first base end and second lid end, where the base and the wall form an interior space within the container, a removable lid for positioning on the second lid end, a mechanism for removably sealing the lid to the second lid end, at least one gas inlet port, and at least one gas outlet port;
   b. a gas permeable receptacle adapted to be placed within the interior of the container;

c. a gas scrubbing medium for removing contaminants from the gas stream, wherein the gas scrubbing medium is placed within the gas permeable receptacle; and d. a gas extraction device adapted to be inserted into the gas permeable receptacle, wherein the gas extraction device is connected to the at least one gas outlet port.

9. The system of claim 8 wherein the at least one gas inlet port is connected to a gas inlet line and the at least one gas outlet port is connected to a gas extraction line.

10. The system of claim 8 wherein each container comprises a gas inlet port shut-off valve and a gas outlet port shut-off valve.

11. The system of claim 10 wherein each container comprises diversion piping for bypassing the container.

12. The system of claim 11 wherein the diversion piping comprises a diversion piping shut-off valve.

13. The system of claim 8 further comprising a final polishing tank.

14. The system of claim 8 wherein each container comprises at least one gas analyzer for analyzing gas scrubbing media in the container.

15. The system of claim 8 wherein the plurality of container units are placed in parallel sequential operation.

16. The system of claim 8 wherein the plurality of container units are placed in series sequential operation.

* * * * *